(No Model.)
H. B. ANGELL.
DREDGER CHAIN.
No. 278,482. Patented May 29, 1883.
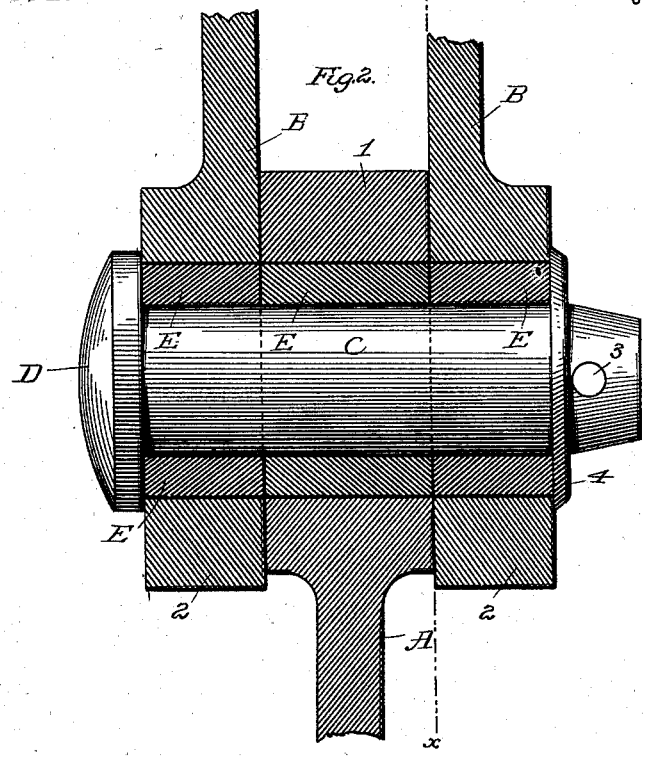
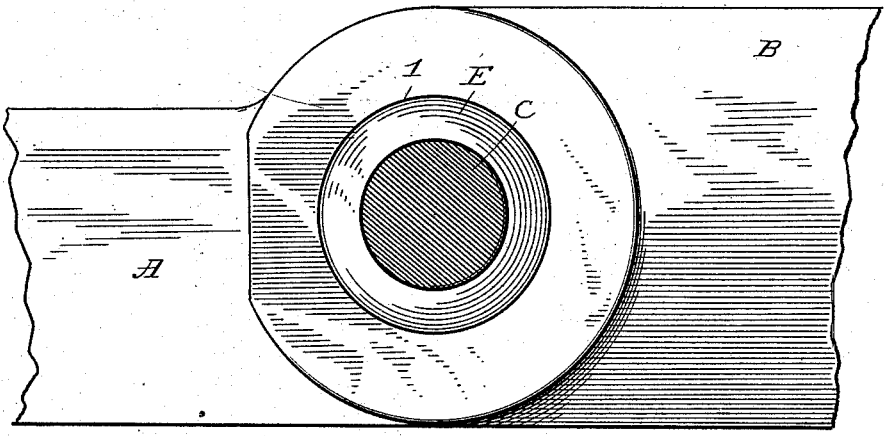
Attest
Walter Donaldson
L. W. Luly
Inventor
Horace B Angell
by Ellis Spear
Atty.

UNITED STATES PATENT OFFICE.

HORACE B. ANGELL, OF SAN FRANCISCO, CALIFORNIA.

DREDGER-CHAIN.

SPECIFICATION forming part of Letters Patent No. 278,482, dated May 29, 1883.

Application filed January 27, 1883. (No model.)

*To all whom it may concern:*

Be it known that I, HORACE B. ANGELL, of the city and county of San Francisco, State of California, have invented new and useful Improvements in Dredger-Chains; and I do hereby declare the following to be a full, clear, and exact description thereof.

My invention relates, generally, to improvements in drive-chains of that class in which the ends of adjoining links are pivoted upon and connected by a transverse pin; and these improvements are applicable more especially to chains used in dredging-machines for elevating the buckets and lowering them again to their work. Chains of this class are exposed, in addition to the ordinary wear caused by the longitudinal strain of one link upon another, to the destructive grinding action of sand and other mineral substances, which work their way into the joint between the links and in a very short time destroy the bearing-surfaces. When these links are connected by a simple steel pin it has been found that in a very few days the wear causes the joint to work loose and in a short time to become unfit for use. Attempts have been made to remedy this difficulty by surrounding the pin with a tubular bushing of hard steel, which could be renewed when worn out. It was found, however, that the wear upon this bushing was so great and so speedy that there was necessity for continually renewing the bushing at some point or other in the length of the chain, and the utility of the chain was thereby greatly lessened and the expense, not only of manufacturing but of keeping it in repair, correspondingly increased.

My invention consists in a peculiar sectional bushing interposed between the pin and the bearing-surface of the link, each section of which shall be of such a width as to cover the bearing-surface of the eye within which it is held.

In the accompanying drawings, Figure 1 represents a side elevation, showing the adjoining ends of two links. Fig. 2 is a horizontal section through the center of the link.

The chain which is illustrated in these drawings is formed, in the usual way, of alternate single links A and double links B. The eye 1 of the link A is inserted between the eyes 2 of the link B, so that the openings register, and through these openings is passed the pin C, which is composed preferably of hard steel. The pin C has a head, D, of greater diameter than that of the eye, and is of sufficient length to extend a short distance beyond the link on the opposite side, and to be bored out transversely to receive a pin, 3, which holds it in place and prevents it from being withdrawn. A washer, 4, is preferably placed on the pin, so as to bear against the outside surface of the link, as shown in Fig. 2. In order to relieve the steel pin from all wear, I interpose between such pin and the moving surface of the links tubular sleeves or bushings E E E. Each of these bushings is just of sufficient length to fit the bearing-surface of the eye to which they are applied, and when placed upon the pin they exactly fill the space between the head of the pin and the washer, the joints between them exactly registering with the joints of the link. They are therefore free to move independently on the pin and with the link against which they bear, and it will be evident that all the wear is upon the bushings, the steel pin being entirely protected. I prefer to make my bushings of either gun-metal or phosphor-bronze. These metals, while soft as compared with hard steel, nevertheless possess great toughness and tenacity, which adapts them particularly for use in bearings, and while their wearing qualities are greater than those of steel, they can also be replaced, when necessary, at much less expense.

It is evident that in chains of this class the wear is entirely in the direction of the length of the chain, so that the bushings will wear constantly in one place. The described bushings, therefore, are capable of being adjusted by removing the pin and bushings and inserting them in different positions in the links, so as to present a new bearing-surface. This can be done repeatedly, or until the bushing is entirely worn out, when new ones can be inserted at slight expense. It may be stated, as showing the advantage obtained by the use of soft metal for this purpose, that the hard-steel bushing exposed to ordinary wear in a dredger-chain will only last ten days, while a gun-metal or phosphor-bronze bushing similarly used has remained in use for four months. As the second link, A, pulls in an opposite direction from the links B, the wear is on opposite sides of the respective bushings, and they are therefore made of independent sections, as described, since a single cylinder would be pulled or twisted out of shape by the strain.

I am of course aware that gun-metal has often been employed as a bearing-surface, but, as far as I am aware, never in this particular connection. In an ordinary journal-bearing it is exposed only to continued rotary wear, while here the wear is entirely in the direction of the length of the chain, and consequently upon opposite sides of the bushing.

I am also aware that sectional bushings, the sections being in length greater than the thickness of the links and upset or otherwise formed on the links, are not new.

What I claim as my invention is—

The combination of the single and double links with tubular sectional bushings, each section being of the length of the eye in the link to which it is applied, and the pin passing through the sections, as described.

In witness whereof I hereunto set my hand.

HORACE B. ANGELL.

Witnesses:
ISRAEL W. KNOX,
CARLTON F. MOULTHROP.